Patented May 21, 1940

2,201,762

UNITED STATES PATENT OFFICE

2,201,762

SULPHAMIC ACID SALTS OF POLYMERIC AMINO COMPOUNDS

Martin Eli Cupery, Wilmington, Del., assignor to E. I. du Pont de Nemours & Company, Wilmington, Del., a corporation of Delaware No Drawing. Application May 27, 1938, Serial No. 210,531

7 Claims. (Cl. 260—45)

This invention relates to new compositions of matter and more particularly to compositions of matter obtainable by reacting sulphamic acid with polymeric amino nitrogen containing substances soluble in 5% aqueous acetic acid, insoluble in water and 5% aqueous ammonia, and capable of being formed into a coherent film.

This invention has as an object the preparation of new compounds. A further object is the preparation of new emulsifying, dispersing, sizing, thickening and adhesive agents. Other objects will appear hereinafter.

These objects are accomplished by the following invention wherein sulphamic acid is reacted, preferably in aqueous solution, with a polymeric amino nitrogen containing substance soluble in 5% aqueous acetic acid, insoluble in water and 5% aqueous ammonia, and capable of being formed into a coherent film.

In one mode of the practice of the invention, the polymeric amino nitrogen containing substance, hereinafter called the amino polymer, is stirred with a solution, preferably aqueous, of sulphamic acid. The solution thus made is frequently used without isolation of the compound or reaction product which may, however, be isolated by appropriate procedures as given in detail below.

The more detailed practice of the invention is illustrated by the following examples. Parts given are by weight. There are of course many forms of the invention other than these specific embodiments.

Example I

Twenty (20) parts of medium viscosity partially deacetylated chitin, prepared according to the procedure outlined in Rigby U. S. P. 2,040,879, was stirred into 460 parts of water containing 20 parts of sulphamic acid. After stirring for 15 minutes a clear homogeneous solution of the sulphamic acid derivative of the partially deacetylated chitin was obtained. This solution, which had a viscosity of about 15 poises at 25° C., was slowly poured with stirring into 2000 parts of methanol and allowed to stand for about one hour. The precipitated compound of sulphamic acid and partially deacetlyated chitin was separated by filtration and dried in an oven at 70° C. for 2 hours. The final product was a dry powder which was non-hygroscopic on exposure to a humid atmosphere and which was readily redissolved in water.

Attempts to prepare similarly the solid acetic acid derivative of the same deacetylated chitin were not successful. A gel-like mass formed upon addition of the reaction mixture to methanol. Moreover, acetic acid was volatilized during the drying operation at 70° C., thereby rendering the final product insoluble in water. The corresponding sulphuric acid derivative made from the same partially deacetylated chitin was found to be entirely insoluble in water.

Upon heating the dry sulphamic acid derivative of partially deacetylated chitin, preferably in an inert atmosphere of nitrogen, at 140–160° C. for one-fourth to one hour, a product soluble in dilute alkali as well as in water is obtained.

Solutions of the sulphamic acid-partially deacetylated chitin reaction products show delayed precipitation of the insoluble sulphuric acid derivatives of deacetylated chitin when solutions containing sulphate ion are added, a period of 3 to 24 hours being generally required before precipitation begins to take place. On the other hand, under similar conditions, immediate precipitation of the insoluble sulphuric acid derivatives of partially deacetylated chitin occurs when a soluble sulphate in solution is added to an aqueous solution of the acetic acid derivative of the deacetylated chitin.

There may be used in Example I with good results, any of the grades of deacetylated chitin described in U. S. 2,040,879.

Example II

Eight (8) parts of phenol-formaldehyde-methylamine resin prepared by the method described in Example I of U. S. Patent 2,098,869, was dissolved in 92 parts of 2% aqueous sulphamic acid. The resulting solution had a viscosity of about 10 poises at 25° C. A film obtained by evaporation of the solution on a glass plate was clear and transparent.

In place of the above resin, any other primary amine-phenol-aldehyde resins such as those disclosed in U. S. Patent 2,098,869 may be used with like results.

Example III

Eight (8) parts of phenol-formaldehyde-dimethylamine resin prepared by the method disclosed in Example I of U. S. Patent 2,031,557, was dissolved in 92 parts of 5% aqueous sulphamic acid forming a clear, transparent solution. Such solutions showed high surface active properties and foamed strongly when shaken. A clear film of the resin-sulphamic acid reaction product was obtained by drying the solution flowed upon a glass plate. Heating the film at 100° C. for one hour lowered its solubility in water so that it was only slightly soluble.

In place of the above resin, any of the other secondary amine-phenol-aldehyde resins of U. S. 2,031,557 may be similarly converted into compounds of sulphamic acid. In general, such compounds show high solubility in water, and the resulting solutions at equivalent concentrations have a lower viscosity than analogous solutions of the corresponding compounds of other inorganic acids. These reaction products of sulphamic acid with amine-phenol-aldehyde resins also show better heat resistance and storage stability than corresponding compounds of organic acids such as formic, acetic and propionic acids.

Example IV

To 90 parts of 0.5% aqueous sulphamic acid solution was added with stirring 10 parts of diethylaminomethylzein which was prepared according to the method described in Example IV of Meigs copending application, Serial No. 59,643, filed January 17, 1936 Patent No. 2,143,023. The zein derivative readily dissolved to form a clear, viscous solution. A film of the solid sulphamic acid-diethylaminomethylzein reaction product was obtained upon evaporating a layer of the solution placed upon a glass plate. Heating the film in an oven at 100° C. for 1 to 2 hours did not insolubilize the film.

Solutions of the above diethylaminomethylzein sulphamic acid reaction product show good foaming properties even in the presence of calcium salts. On the other hand, the sulphuric acid derivative of diethylaminomethylzein, similarly prepared shows low solubility and poor surface active properties in the presence of ordinary "hard water" salts.

In place of the above-mentioned zein derivative, any of the other acid-soluble resinous reaction products of a protein, an amine of less than nine carbon atoms and a lower aliphatic aldehyde or ketone, disclosed in Meigs copending application, Serial No. 59,643, filed January 17, 1936, may be used with like result and with advantages analogous to those mentioned above.

Example V

To 90 parts of 2% aqueous sulphamic acid solution was added with stirring 10 parts of polymeric beta-diethylaminoethyl methacrylate which had been prepared and polymerized as described in Example II of Harmon copending application, Serial No. 21,810, filed May 16, 1935 Patent No. 2,138,762. The resulting solution was clear and transparent, had a viscosity of about 5 poises at 25° C. and showed moderate foaming and surface active properties. Upon removal of the excess sulphamic acid by addition of sodium nitrate, the solution showed greatly improved foaming properties. No precipitation took place even upon the addition of a large excess of sodium nitrite to the solution. The nitrogen liberated by reaction of sodium nitrite with sulphamic acid caused extensive foaming of the solution.

A cotton broadcloth fabric impregnated with about 1% of the above sulphamic acid compound of polymeric diethylaminoethyl methacrylate showed a definite sizing effect. No deleterious effect on the fabric was noticeable after heating the treated fabric for 1 hour at 100° C.

Similar sulphamic acid compounds may be readily prepared in like manner from any of the polymeric tertiary amino acrylates and methacrylates described in Harmon copending application, Serial No. 21,810, filed May 16, 1935.

A large variety of polymeric substances which contain basic amino groups may be employed for the preparation of sulphamic acid compounds. Generically applicable are polymeric amino nitrogen containing substances which are soluble in 5% aqueous acetic acid, insoluble in water and 5% aqueous ammonia, and capable of being formed into a coherent film. In addition to the types already illustrated in the examples, the following further classes of such polymeric materials may be employed: (1) amino polymers derived from reaction of vinyl ketone polymers with ammonia or primary amines, such as those described in Balthis, Ser. No. 69,725, filed March 19, 1936, Patent No. 2,122,707; (2) polymeric products obtained by the hydrogenation, in the presence of ammonia or amines, of resins containing ketone groups, such as are described in Greenewalt U. S. Patent 2,063,158; (3) amino polymers derived from the reaction of formaldehyde with tertiary aminophenols, e. g., those disclosed in Graves copending application, Serial No. 82,651, filed May 29, 1936, Patent No. 2,147,789; (4) aminocelluloses soluble in dilute acetic acid containing an amino nitrogen attached to the cellulose nucleus or separated therefrom by a chain of carbon atoms, for example, those described in Hardy copending application, Serial No. 61,842, filed January 31, 1936, Patent No. 2,136,296, and in Haskins copending application, Serial No. 61,806, filed January 31, 1936, Patent No. 2,136,299; (5) polymeric amino-nitrogen containing resins soluble in dilute acetic acid, prepared by treating polyvinylchloroacetate with secondary amines; (6) resins prepared by reacting aliphatic or alicyclic ketones with formaldehyde and primary or secondary aliphatic amines; (7) resinous products resulting from the reaction between diphenyl- or other diarylguanidine, formaldehyde and primary or secondary amines; (8) resins prepared by reacting urea and formaldehyde with lower primary or secondary aliphatic amines; (9) reaction products of epichlorohydrin with ammonia or primary aliphatic amines, which reaction products have been polymerized in the presence of catalytic proportions of stannic chloride; (10) the reaction product of phenol-lignin with dimethylamine and formaldehyde; (11) the reaction products of triethanolamine with phthalic esters.

Additional examples of specific polymeric amino-nitrogen containing substances which function in this invention are as follows: resorcinol-formaldehyde-methylamine resin; phenol-formaldehyde-cyclohexylamine resin; phenol-formaldehyde-ethylene-diamine resin; xylenol-formaldehyde-methylamine resin; phenol-formaldehyde-n-butylamine resin; phenol-formaldehyde-diethylamine resin; phenol-formaldehyde-dibutylamine resin; phenol-formaldehyde-diethanol-amine resin; dimethylaminopropyl cellulose; $\beta$-aminoethoxyethyl cellulose; $\beta$-dibutylaminoethyl cellulose; the mixed aminoethyl-aminoethoxypropyl ether of cellulose; dibutylaminopropyl cellulose; the mixed methyl dimethylaminopropyl ether of cellulose; amyl-aminomethyl cellulose; diethylamino glycol cellulose; hydroxyethylamino glycol cellulose; benzyl-amino methyl cellulose; diethylamino methyl cellulose; 2-hdroxycyclohexylamino methyl cellulose; amylamino cellulose; $\beta$-dicyclohexylaminoethyl methacrylate polymer; $\beta$-di-n-butylaminoethyl methacrylate polymer; $\beta$-dimethylaminoethyl methacrylate polymer; triethanolamine monomethacrylate polymer; 2-(diethylamino)cyclohexyl methacrylate polymer; 4-(β-methacrylyloxyethyl) morpholine polymer; β-diethylaminoethyl acrylate polymer; β-dicyclohexylaminoethyl acrylate polymer; 1-(β-acrylyloxyethyl)piperidine polymer; the resins obtained by the hydrogenation, in the presence of ammonia, of polymerized bis-(4-ketocyclohexyl)-dimethylmethane; the resin resulting from the hydrogenation, in the presence of ammonia, of methylenecyclohexanone polymer; the resin obtained from the hydrogenation, in the presence of ammonia, of polymerized methyl vinyl ketone; the reaction product of polymeric methyl α-methylvinyl ketone and aqueous ammonia; the reaction products of polymeric methyl vinyl ketone and aqueous ammonia (or cyclohexylamine, glucamine, ethanolamine, or ethylenediamine); dimethylaminoethylzein; dietylaminoethylzein; dibutylaminoethylzein; cyclohexylaminomethylzein; piperidylmethylzein; piperidylmethylglycinin; dimethylaminomethylgliadin; dimethylaminoethylcasein; monoethylaminomethylzein; meta-diethylaminophenol-formaldehyde resin; the reaction product of polyvinyl chloroacetate and dibutylamine; the resin obtained by reacting cyclohexanone and formaldehyde with methylamine; the products obtained by reacting acetone and paraformaldehyde with methyl or butylamine; the resin obtained by reacting diphenylguanidine and formaldehyde with methylamine; and the resins obtained by reacting urea and formaldehyde with methyl-, dimethyl-, butyl-, or dibutylamine.

As shown in the examples, it is in most cases preferable to prepare the amino polymer-sulphamic acid reaction product by dissolving the polymeric amine in a dilute aqueous solution of sulphamic acid. The compound may then be isolated by evaporation of the solution or by precipitation through the addition of water miscible organic solvents in which the addition compound is insoluble. An alternative procedure which may be used in certain cases comprises stirring a solution or finely divided suspension of the polymeric amine in an organic solvent, such as acetone, ether or alcohols, with a slight excess of sulphamic acid. Methanol is the preferred solvent or medium for such procedure as it will dissolve approximately 4% by weight of sulphamic acid and give more rapid conversion of the polymeric amine to the desired product. If a crystalline grade of sulphamic acid is used, the excess acid remaining undissolved after conversion of the polymeric amine into the sulphamic compound may be separated from the compound which was prepared by difference in flotation, i. e., the heavy crystals of sulphamic acid readily settle to the bottom of the suspension while the less dense compound rises to the upper portion thereof and can be readily separated. The amine polymer-sulphamic acid products prepared by this solvent method are more easily dried than those prepared in water solution. Also, they are obtained in a finely divided physical form and can be more readily dissolved in water.

These new compounds of sulphamic acid with amino polymers show by their behavior that they are different from products obtained similarly by reaction of other acids with amino polymers. Thus the solubility in alkali after heat treatment of the compounds of the amino polymer with sulphamic acid, the lack of an immediate precipitation by sulphate iron, and the like, indicate a different structure and a different kind of compound.

These new compounds show striking and unexpected advantages over products made similarly from amine polymers and other acids. Thus the sulphamic acid compounds are, in general, more readily isolated and dried with heat to a dry, solid, stable, form without volatilization of the acid and loss of solubility by the product. The isolation and preservation of the dry, solid, sulphamic acid reaction products does not involve difficulties arising from hygroscopicity such as are frequently experienced with analogous derivatives of other acids, especially lactic acid. Further, the amino polymer-sulphamic acid reaction products are superior to those from acetic acid in that the latter are unstable and readily lose combined acetic acid upon being heated or upon storage at ordinary temperature for an extended period of time.

Sulphamic acid compounds of amine polymers in general also show exceedingly high solubility in comparison with the corresponding derivatives of many of the well known organic and inorganic acids. For example, amino polymers in many cases form highly insoluble compounds with acids such as sulphuric acid, boric acid, phosphoric acid, oxalic acid, succinic acid, salicyclic acid and the like.

A still further unexpected property of sulphamic acid compounds of amine polymers is that, in general, they show increased stability toward precipitation by substances which normally would produce almost instantaneous precipitation if the corresponding amine compound of another acid were used. An illustration of such delayed precipitation is given under Example I above. Such delayed precipitation allows the use of the products of the present invention in instances where the analogous derivative of other acids are totally unsatisfactory because of the objectionable precipitation which takes place owing to unavoidable contaminating substances present in compositions or solutions added to the amine polymer derivative. Sulphamic acid derivatives are therefore superior and frequently are the only compounds which can be satisfactorily employed when precipitation must be avoided.

An additional advantage shown by sulphamic acid compounds of the present invention is that the sulphamic acid present therein in combined form may readily be converted into sulphuric acid by simple treatment with nitrous acid or under suitable conditions with a nitrite. That is, an acidified solution of an amine polymer compound of sulphamic acid may be treated, under proper conditions, with a nitrite such as sodium nitrite, whereupon a rapid reaction takes place in which nitrogen is liberated and the sulphamic acid is converted into sulphuric acid, or into sodium acid sulphate. Such conversion into the sulphuric acid compound thus allows a controllable change in solubility and the phenomenon may be utilized for breaking emulsions. That is, the highly soluble sulphamic acid-amino polymer reaction product which has been used as an emulsifying agent may be rapidly converted into the insoluble sulphuric acid amino polymer reaction product, which has practically no emulsifying property. The emulsion in such a case is broken down into its component parts, which may then be separated by simple methods. Such separation is frequently difficult, if not impossible, to obtain in any other way.

The sulphamic acid compounds of amine polymers described in this specification may be employed for many and varied uses. For example, they may be used as emulsifying or dispersing agents, as thickening agents for increasing the viscosity of aqueous solutions, as adhesives for paper and wood, as stabilizing agents for easily oxidizable solutions, insect poisons, fungicides, and various related uses. In addition, they may be used in preparing formed articles such as films, or molded plastic masses, especially when used in combination with molding resins. Furthermore, these compounds may be used as sizing or coating materials.

The above description and examples are intended to be illustrative only. Any modification of or variation therefrom which conforms to the spirit of the invention is intended to be included within the scope of the claims.

I claim:

1. A sulphamic acid salt of polymeric amino nitrogen containing substance soluble in 5% aqueous acetic acid, insoluble in water and 5% aqueous ammonia, and capable of being formed into a coherent film.

2. A sulphamic acid salt of a resinous reaction product of a phenol, an aldehyde and an aliphatic amine having at least one hydrogen on the amino nitrogen, said resinous reaction product being soluble in 5% aqueous acetic acid, insoluble in water and 5% aqueous ammonia, and capable of being formed into a coherent film.

3. A sulphamic acid salt of a phenol formaldehyde methyamine resin soluble in 5% aqueous acetic acid, insoluble in water and 5% aqueous ammonia, and capable of being formed into a coherent film.

4. A sulphamic acid salt of deacetylated chitin.

5. A sulphamic acid salt of a polymeric tertiary amino ester of an acid of the class consisting of acrylic and methacrylic acids.

6. A sulphamic acid salt of a dialkylaminoalkyl ester of an acid of the class consisting of acrylic and methacrylic acids.

7. A sulphamic acid salt of beta-diethylaminoethyl methacrylate.

MARTIN ELI CUPERY.

CERTIFICATE OF CORRECTION.

Patent No. 2,201,762. May 21, 1940.

MARTIN ELI CUPERY.

It is hereby certified that error appears in the printed specification of the above numbered patent requiring correction as follows: Page 1, first column, line 48, for "deacetlyated" read --deacetylated--; page 2, first column, line 61, for "nitrate" read --nitrite--; and second column, line 72, for "2-hdroxycyclohexylamino" read --2-hydroxycyclohexylamino--; page 3, first column, line 4, for "methacrylyloxylethyl" read --methacrylyloxyethyl--; lines 20 and 21, for "dimethylaminoethylzein; dietylaminoethylzein; dibutylaminoethylzein;" read --dimethylaminomethylzein; diethylaminomethylzein; dibutylaminomethylzein;--; line 75, for "iron" read --ion--; page 4, first column, line 22, claim 1, before "polymeric" insert --a--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.